United States Patent [19]

Foster

[11] Patent Number: 5,097,139
[45] Date of Patent: Mar. 17, 1992

[54] INFRARED TARGET GENERATOR

[75] Inventor: Joseph W. Foster, Huntsville, Ala.

[73] Assignee: The United States of America as represented by the Secretary of the Army, Washington, D.C.

[21] Appl. No.: 689,681

[22] Filed: Apr. 19, 1991

[51] Int. Cl.$^5$ .............................................. G01J 1/00
[52] U.S. Cl. ............................... 250/504 R; 250/495.1
[58] Field of Search .............. 250/494.1, 495.1, 504 R

[56] References Cited

U.S. PATENT DOCUMENTS

| | | | |
|---|---|---|---|
| 3,080,483 | 3/1963 | Jaffe et al. | 250/495.1 |
| 3,978,342 | 8/1976 | Hagen et al. | 250/495.1 |
| 4,650,997 | 3/1987 | Yawn et al. | 250/334 |
| 4,917,490 | 4/1990 | Schaffer et al. | 250/341 |

Primary Examiner—Bruce C. Anderson
Attorney, Agent, or Firm—Freddie M. Bush; Hay Kyung Chang

[57] ABSTRACT

Pivotable, reflective target elements are used to reflect infrared radiation from blackbody sources and transmit the radiation toward infrared-detecting device to test the capability of the device to detect patterns of infrared radiation under dynamic field environment.

6 Claims, 1 Drawing Sheet

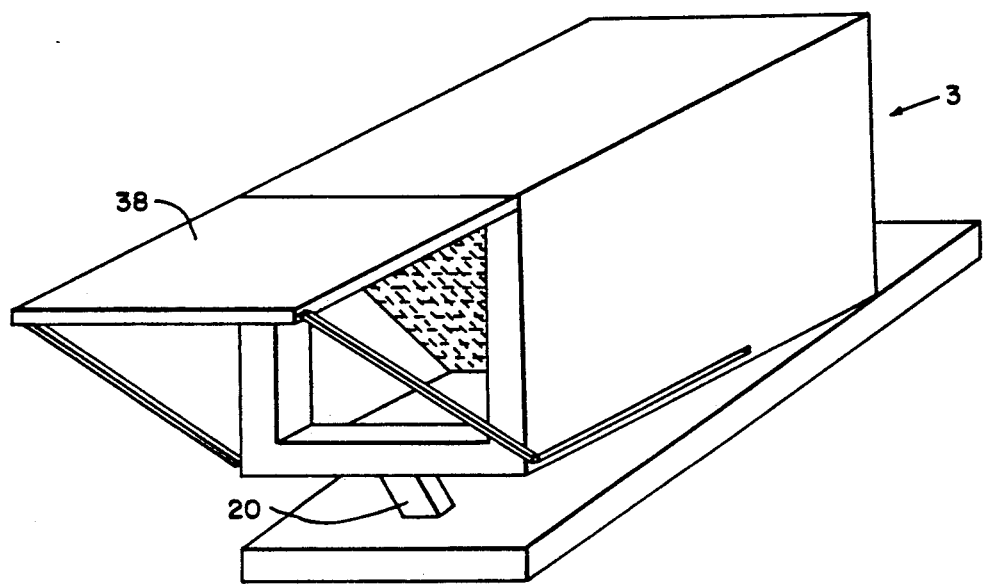
FIG. 1
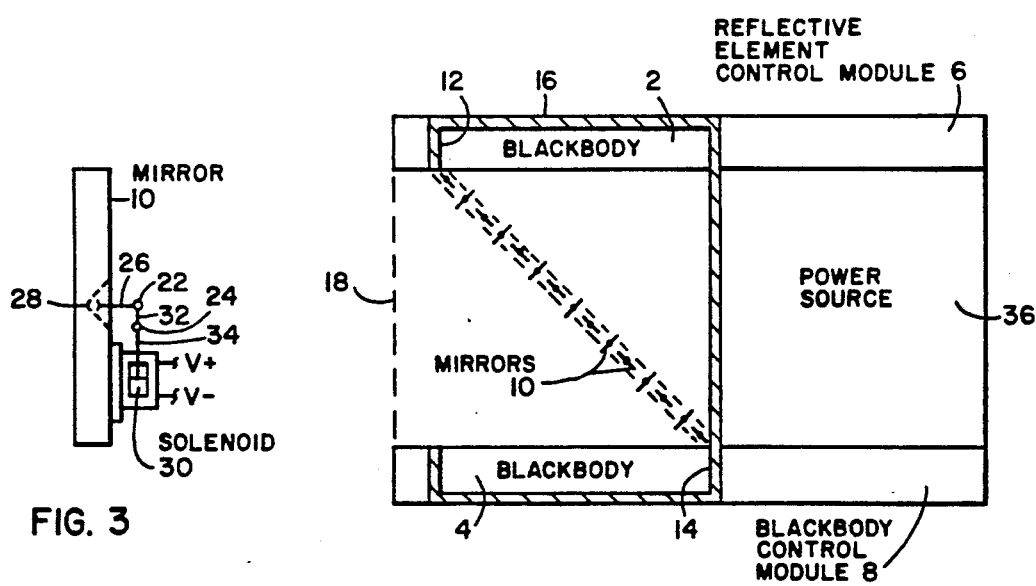
FIG. 3
FIG. 2

INFRARED TARGET GENERATOR

DEDICATORY CLAUSE

The invention described herein may be manufactured, used, and licensed by or for the Government for governmental purposes without the payment to me of any royalties thereon.

BACKGROUND OF THE INVENTION

At present, there are no known, reliable ways to test infrared radiation detecting devices in a full-scale, field test environment for performance characteristics such as minimum resolvable temperature, noise equivalent temperature difference, system resolution and many other performance parameters.

To test infrared detecting devices, the present technology is capable of providing two types of infrared test targets: one type is variable targets under controlled laboratory conditions; the other type is fixed full-scale targets under field conditions. As of date, no target generator exists which can combine both types to provide variable-pattern, variable-temperature, full-scale infrared targets under real-time, dynamic conditions. Many previous failed attempts at fabricating such a target generator concerned themselves with the problem of how to control quickly the temperature of an individual target element while maintaining uniformity among the target elements. Capability for timely temperature change requires that each target element have a low thermal mass while capability to maintain target element uniformity requires that each target element have a large thermal mass. The resulting design is a marriage of the two opposing requirements with the offspring requiring an extremely high power consumption to maintain a tight temperature control loop. The additional requirements of thermally isolating each of these target elements from its neighbor and producing a significant number of such elements with similar response characteristics soon drives the complexity and cost to an impractical level.

SUMMARY OF THE INVENTION

The invention described herein utilizes pivoting, reflective target elements instead of attempting to control the temperature of each individual element. Each element is pivotable independently of any other element and the orientation of each element is changed according to which of two blackbody sources is to be reflected by the element. Use of such pivoting reflective elements results in a simple, yet effective infrared target generator.

DESCRIPTION OF THE DRAWINGS

FIG. 1 depicts the external view of the target generator.

FIG. 2 is a cut-away side view of the target generator.

FIG. 3 shows the details of the pivotal mechanism of each reflective element.

DESCRIPTION OF THE PREFERRED EMBODIMENT

Referring to the drawings wherein like numbers refer to like parts, FIG. 1 presents an external view of the target generator 3. The details of the structure of the generator are shown in FIG. 2 which is a cut-away side view of the generator. Inside housing 16 are located two blackbody sources 2, 4 which are parallel with each other and positioned at opposite walls of the housing as shown in the drawing. The temperature of blackbody sources 2, 4 is controlled by blackbody control module 8 which is coupled to blackbody sources 2, 4 in a suitable, conventional manner. The blackbody sources and control module 8 are readily available from commercial sources such as Electro-Optical Industries.

Placed between blackbody sources 2, 4 inside housing 16 are a plurality of reflective elements 10 which are arranged in a planar array the plane of which is diagonally disposed with respect to the planes of blackbodies 2,4 and is adjacent to front end 12 of blackbody 2 and to rear end 14 of blackbody 4. In most cases, such an arrangement results in the plane of the array of reflective elements 10 being in 45 degrees to the planes of blackbody sources 2, 4. Each of reflective elements 10 has only one reflective side which can be turned into one or the other of two possible positions: one position (referred to as "positive", for sake of convenience) to reflect radiation from blackbody source 2 and transmit the radiation outwardly through top 18 of housing 16 and second position (referred to as "negative."), to reflect radiation from blackbody source 4 and transmit the radiation outwardly through top 18 of the housing. These two positions of a reflective element are at 90 degrees with respect to each other. Obviously, top 18 must be suitably transparent to infrared radiation which is emitted by the blackbody sources. The infrared-detecting device under test is evaluated for its ability to detect the pattern of infrared radiation emanating thusly from target generator 3.

The rotation of each of reflective elements 10 into the positive or negative positions is controlled by reflective elements control module 6 which is coupled in conventional manner to each of reflective elements 10 to control the pivotal position thereof. Each reflective element is identical to the adjacent elements and is pivotable independently of any other element in the array. The mechanism which allows each reflective element to rotate into the two alternate positions is shown in FIG. 3. Element 10 is pivotable on horizontally mounted pivot 28 by means of solenoid 30 which is attached to pivot pin 26 via suitable connections 32, 34 and universal connections 22, 24. Selenoid 30 is coupled to reflective element control module 6 which is powered by a suitable power source 36. The power source may also empower blackbody source control module 8 to make the entire target generator 3 more compact. Pivot 28 of each element should be located slightly below the center of gravity of the element so that once the element has been pivoted into a desired position, the element will remain in the position even when power is removed from the solenoid. This particular positioning of the pivot helps eliminate interference with the infrared image caused by heating of the solenoid.

The invention described herein has been demonstrated using, along with two three meter-by-three meter blackbody sources, a matrix of 225 identical mirrors, each mirror being about 20 cm wide and about 28.5 cm long. However, the more mirrors there are in the array of mirrors, the more variable are the targets which can be generated by target generator 3. Also, the dimensional numbers of each mirror are not significant except in their ratio to each other.

Although a particular embodiment and form of this invention has been illustrated, it is apparent that various modifications and enhancements of the invention may be made by those skilled in the art without departing from the scope and spirit of the foregoing disclosure. One such enhancement is fabricating housing 16 of insulating material that provides to blackbody sources 2, 4 protection from external environmental conditions by minimizing convective and conductive nonuniformities. Solar shade 38 as shown in FIG. 1 provides protection against solar loading. Elevation shaft 20 varies the pitch of housing 16 from 0 degree to 30 degrees relative to the line-of-sight of the infrared detecting device under test. This allows the device under test to be operated as an airborne or tower-mounted unit operating at varying ranges and/or altitudes from target generator 3. Another modification that may be made to the invention described herein is utilization of remotely-operated control electronics which are suitably coupled to the control modules to enable the operator to control the temperatures of blackbody sources 2, 4, the position of each of reflective elements 10 as well as varying the pitch of housing 16 while being situated up to 500 meters from target generator 3. The remotely operated control electronics may consist of a man-portable, microprocessor-controlled, data translation and acquisition system along with the associated interface/drive electronics allowing remote operation of the target generator.

Accordingly, the scope of the invention should be limited only by the claims appended hereto.

I claim:

1. An infrared target generator comprising:
    a hollow housing having a top and a bottom, said top being transparent to infrared radiation; first and second blackbody sources disposed in parallel within said housing and diametrically opposed to each other, said blackbody sources each having a front end and a rear end; a planar array of rotatably mounted reflective elements positioned between said blackbody sources to reflect radiation from said blackbody sources outwardly through said top of said housing, a suitable means for rotating said reflective elements and a means for empowering said blackbody sources.

2. A target generator as set forth in claim 1 wherein the plane of said array is adjacent to said front end of said first blackbody source and to said rear end of said second blackbody source.

3. A target generator as set forth in claim 2 wherein each of said reflective elements is mounted for rotation independently of rotation of any other element in said array and is first position suitable for reflecting radiation from said first blackbody source and second position suitable for reflecting radiation from said second blackbody source.

4. A target generator as set forth in claim 3 wherein the plane of said array intersects the planes of said blackbody sources at approximately 45 degrees.

5. A target generator as set forth in claim 4 wherein said reflective elements are identical and each element is longer than it is wide.

6. A target generator as set forth in claim 5 wherein said housing provides insulation to said blackbody sources from external environment.

* * * * *